United States Statutory Invention Registration [19]

[11] Reg. Number: H529

Patel et al. [43] Published: Oct. 4, 1988

[54] COMPACT DEVICE FOR CONTINUOUS REMOVAL OF WATER FROM AN AIRSTREAM CASCADE IMPACTOR

[75] Inventors: Bharatan R. Patel, Etna; Richard G. Sam; F. Miguel Joos, both of Hanover, all of N.H.; Douglas R. Barnes, Xenia, Ohio

[73] Assignee: The United States of America as represented by the Secretary of Air Force, Washington, D.C.

[21] Appl. No.: 110,903

[22] Filed: Oct. 21, 1987

[51] Int. Cl.[4] ..... B64D 11/00; B01D 45/00

[52] U.S. Cl. ..... 244/118.5; 55/300; 55/446

[58] Field of Search ..... 241/118.5; 55/300, 443, 55/444, 445, 446

[56] References Cited

U.S. PATENT DOCUMENTS

| | | | |
|---|---|---|---|
| 567,895 | 9/1896 | Gaiennie | 55/446 |
| 3,248,861 | 5/1966 | Loverchek | 55/446 |
| 3,329,377 | 7/1967 | Peterson et al. | 244/53 |
| 3,352,104 | 11/1967 | Duerr | 60/13 |
| 3,449,891 | 6/1969 | Shohet et al. | 55/306 |
| 3,808,776 | 5/1974 | Jesernig et al. | 55/300 |
| 4,175,937 | 11/1979 | Brandau et al. | 55/444 |
| 4,261,416 | 4/1981 | Hamamoto | 244/118.5 |
| 4,367,078 | 1/1983 | Hendrix | 55/184 |

*Primary Examiner*—Charles T. Jordan

*Attorney, Agent, or Firm*—Bobby D. Scearce; Donald J. Singer

[57] ABSTRACT

A separator for removing frozen or condensed water from an air stream, such as to aircraft environmental and avionics cooling systems, is described which comprises a generally tubular housing having an inlet and outlet, one or more flexible disks and baffle plates disposed in preselected spacing within the housing to define a tortuous air path therethrough, a motor, such as in the form of a magnetic pulse solenoid, operatively connected to each disk for controllably flexing each disk whereby moisture deposited on the disk is removed, and a conduit operatively connected to the housing for draining moisture therefrom.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPACT DEVICE FOR CONTINUOUS REMOVAL OF WATER FROM AN AIRSTREAM-CASCADE IMPACTOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to environmental control systems for aircraft, and more particularly to a compact device for removing suspended water, snow and ice from the air supply system of an aircraft.

Aircraft have environmental control systems (ECS) which may include an air supply for cabin air or avionics cooling which is connected to the compressor region of the engine or auxiliary power unit (APU) of the aircraft. Bleed air at high temperature and pressure is conducted from the engine or APU, passed through a series of heat exchangers and valves, and expanded through an air turbine to near ambient pressure to achieve the desired cooling. The cooled air at the turbine outlet normally is below about 32° F., is slightly above normal cabin pressure, and is saturated with water, a large portion of which condenses into liquid and/or freezes. The fog or snow so produced is highly undesirable in the air fed to the cabin or avionics of the aircraft.

Conventional ECS systems of aircraft operate at an air flow rate of about 25 lb/min, turbine inlet pressure of about 45–60 psia and inlet temperature of about 150° F. and turline outlet pressure of about 1.1 psig. Fogging or icing occurs at the turbine outlet when the ambient air has a moisture content of at least 90 grains of water per lb of air, which translates to ambient conditions where the air temperature is 60° F. at any humidity level or is higher than 60° F. at high relative humidity. The foregoing analysis translates to a maximum needed ice removal rate from the ECS turbine outlet of about 0.44 $ft^3$/hr.

In existing ECS systems, cold air at the turbine outlet is mixed with additional warm bleed air to raise the airstream temperature above freezing, which severely reduces the overall cooling capacity of the ECS. Mixing bleed air with the turbine outlet air can result in loss of cooling capacity as high as 50%. Further, depending on the relative humidity of the bleed air, mixing bleed air with cold turbine outlet air can cause moisture to precipitate from the bleed air, which adds to the fogging problem. Using additional bleed air represents parasitic loss from the engine or APU and induces malfunctions and corrosion in avionics equipment. Therefore, a low pressure, low temperature water separator for removing condensed/frozen moisture at the outlet of the turbine is desirable.

The present invention solves or reduces in critical importance the problems with the prior art and meets the desired criteria just stated by providing a low temperature, low pressure separator downstream of the expansion turbine for removing water, snow or ice from the ECS air supply to an aircraft. The invention comprises in a representative embodiment a plurality of spaced flexible impaction disks and baffle plates mounted alternately within a tubular housing having an inlet and outlet, and a motor operatively connected to the impaction disks for controllably flexing the disks to remove condensed or frozen water from the disks mechanically by flexing or shaking the disks. Liquid droplets and snow or ice particles fall to the bottom of the housing for recovery or into a drain for disposal. Any plurality of cascaded impaction disks may be included to attain a desired efficiency or capacity. The separator may be constructed as a compact unit of less than about one cubic foot and operates reliably at a pressure drop across the separator of four psi or less and a collection efficiency of about 90%. The separator may be installed as an integral part of an ECS on new aircraft or used to retrofit existing aircraft. Considering the undesirable alternative loss of cooling power suffered in existing ECS systems where bleed air is used to warm the snow or fog, the observed pressure drop across the separator is acceptable while providing significant gain in ECS cooling capacity.

It is therefore a principal object of the invention to provide a device for removing condensed or frozen water from an air stream.

It is a further object of the invention to provide a compact device for removing condensed or frozen water from an air supply to a aircraft cabin and avionics.

It is a further object of the invention to provide a compact reliable device for removing water particles from a high-speed gaseous stream with low pressure differential across the device.

These and other objects of the invention will become apparent as the detailed description of representative embodiments proceeds.

SUMMARY OF THE INVENTION

In accordance with the foregoing principles and objects of the invention, a separator for removing frozen or condensed water from an air stream, such as to aircraft environmental and avionics cooling systems, is described which comprises a generally tubular housing having an inlet and outlet, one or more flexible disks and baffle plates disposed in preselected spacing within the housing to define a tortuous air path therethrough, a motor, such as in the form of a magnetic pulse solenoid, operatively connected to each disk for controllably flexing each disk whereby moisture deposited on the disk is removed, and a conduit operatively connected to the housing for draining moisture therefrom.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
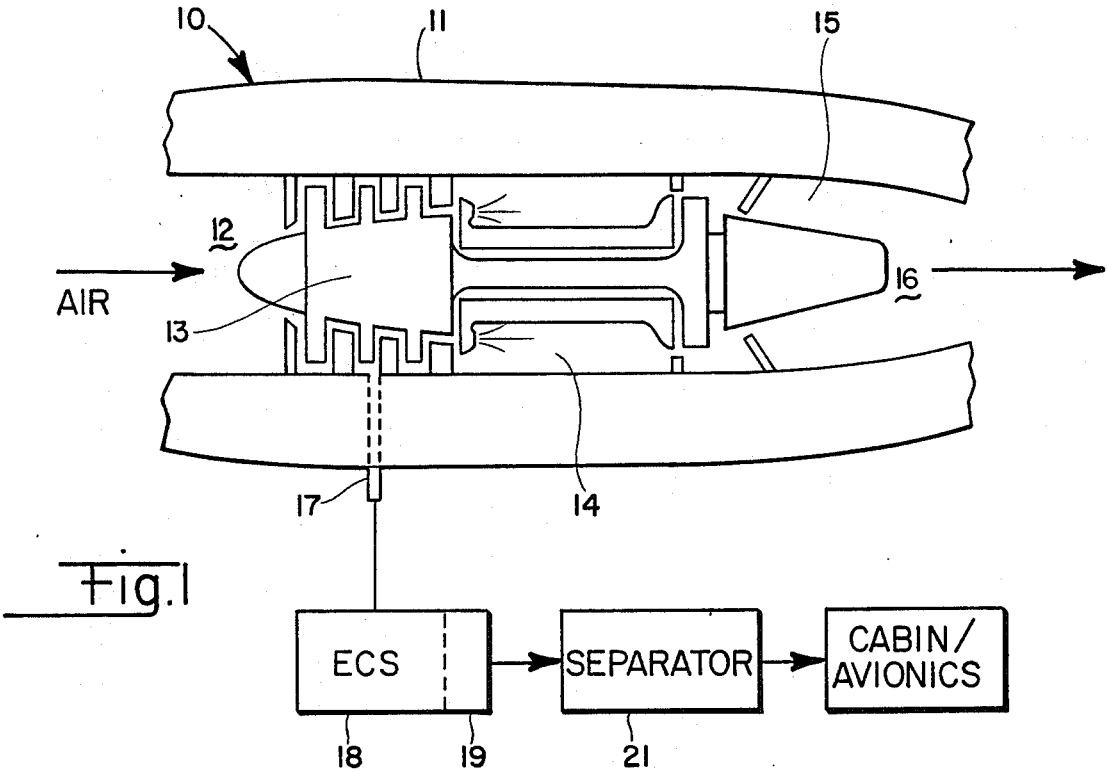
FIG. 1 is a schematic axial sectional view of a gas turbine engine having an ECS system and separator of the invention.

Referring now to the drawings, FIG. 1 shows a schematic axial sectional view of a conventional gas turbine aircraft engine 10 connected to an ECS system for the aircraft and incorporating the separator of the invention. Engine 10 conventionally comprises a suitable supporting structure 11 defining an air inlet and diffuser region 12, compressor region 13, combustor region 14, afterburner 15 and discharge region or exhaust 16. Means may be provided near compressor region 13 of engine 10 to provide a source of air under pressure for supplying the environmental control needs of the aircraft powered by engine 10. Therefore, means defining a conduit 17 may be included to supply compressed air from compressor region 13 for conditioning by ECS system 18 and subsequent use in cooling the cabin or avionics.

In accordance with the teachings of the invention, a separator 21 is disposed downstream of ECS system 18 for removing excess moisture from the air stream supplying cabin and avionics cooling in the aircraft. In operation, air from ECS system 18 is expanded to suitable temperature and pressure by expansion turbine 19 or the like included in ECS system 18.

Figure 2:
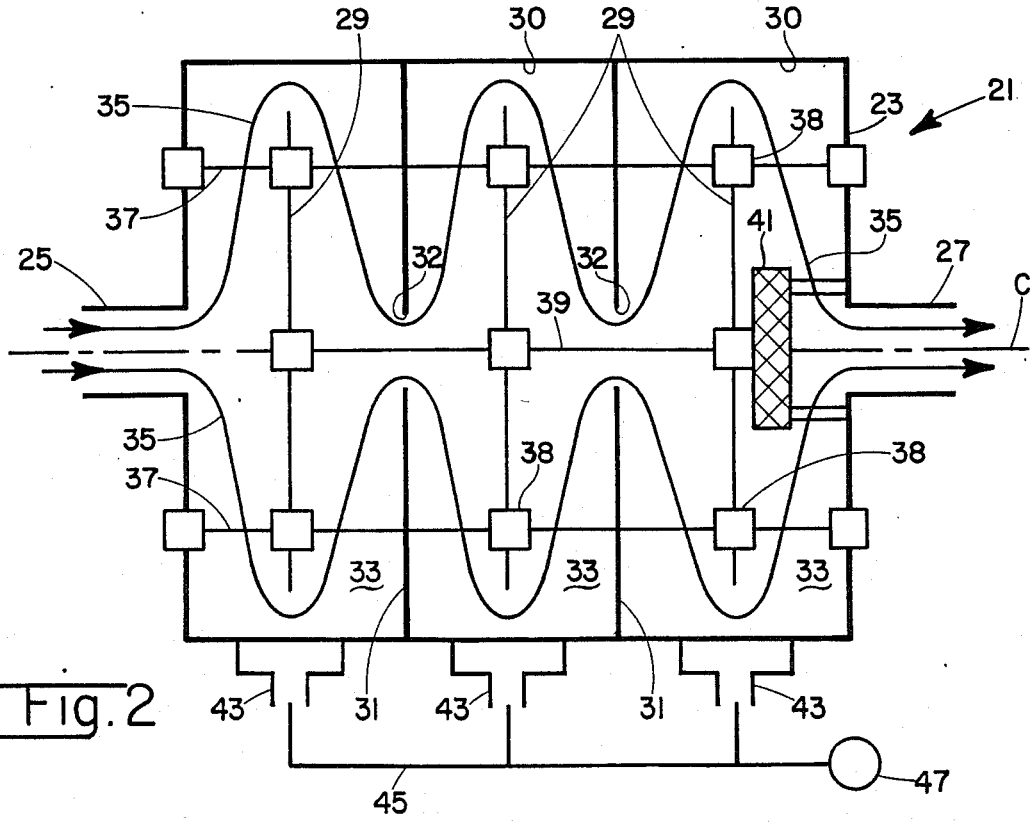
FIG. 2 is a schematic axial sectional view of a representative cascade impactor separator of the invention.

Referring now additionally to FIG. 2, shown therein is a schematic axial sectional view of a cascade impactor separator of the invention built in demonstration thereof, including an illustration of a representative air flow pattern therethrough. Separator 21 comprises a generally cylindrically shaped housing 23 of suitable conventional material, having inlet 25 at one end for operative connection to the outlet of expansion turbine 19 of ECS system 18 and outlet 27 at the other end for operative connection to the cabin or avionics systems requiring conditioned air. One or more flexible impaction disks 29 are disposed centrally of housing 23 and sized to define within housing 23 annular passageways 30 of preselected size. Disks 29 are spaced alternately with a corresponding number of baffle plates 31 having central passageway 32 of preselected size defined therein along central axis C of housing 23. Disks 29 are disposed with preselected spacing relative to baffle plates 31 to define within housing 23 one or more stages (chambers 33) through which air flows in a tortuous path as illustrated at 35. For simplicity of illustration, separator 21 or FIG. 2 is shown with three stages (disks 29, chambers 33). In the operation of separator 21, condensed or frozen water contained in the expanded and cooled air exiting turbine 19 impacts and deposits onto disks 29 as the air stream passes through housing 23 along flow path 35 from inlet 25 toward outlet 27. It is understood that any number of stages (disks 29) may be included in a separator built according to these teachings, the number selected for a particular application depending on the permissible pressure drop across the length of separator 21, housing 23 dimensions, flow rates, operating temperature and pressure, and impaction disk and baffle dimensions, spacing and surface roughness.

Disks 29 may comprise thin flexible disks of aluminum, fiber reinforced plastic, or other metallic or nonmetallic material of desired light weight and flexibility to withstand repeated flexing. Each disk 29 is attached at one or more points near its periphery to housing 23 or to an adjacent baffle plate 31 by connecting rods 37 and pivotal mounts 38 to hold the peripheral portion of each disk 29 substantially fixed within housing 23. Centrally located connecting rod 39 interconnects the center of each disk 29 with a motor 41 which is capable of controllably producing small amplitude/high frequency or large amplitude/low frequency flexions in each disc 29 via rod 39 substantially along axis C. It is understood that alternative structures interconnecting motor 41 and disks 29 may be devised within the contemplation of the invention by one with skill in the applicable art guided by these teachings for the purpose taught herein, which alternative structures are included within the scope of the appended claims. In a separator 21 built in demonstration of the invention, motor 41 comprised a magnetic pulse solenoid. In operation of the invention, controlled flexing of disks 29 through activation of motor 41 results in cracking of frozen deposits on disks 29, which deposits along with condensed liquid fall to the bottom of housing 23 for removal.

A collection tube 43 may be disposed in communication with each chamber 33 and connected through drain line 45 to outlet 47 as conduit means to collect and dispose of snow or water accumulation. Tubes 43 may be gravity drained or may be purged by controllably bleeding air from housing 21 through tubes 43.

In the demonstration unit, housing 23 was about 12 inches diameter by about 12 inches long, with a free internal volume of about 0.5 cubic feet and three inch inlet 25 and outlet 27. Disks 29 were metallic nine inches in diameter by $\frac{1}{8}$ inch thick defining an annular flow passage 30 about $1\frac{1}{2}$ inches wide. Five disks 29 (stages) were included in the demonstration unit for testing purposes with spacing between adjacent disks 29 and baffle plates 31 of about $\frac{3}{4}$ inch. Central passage 32 in each baffle plate 31 was about three inches in diameter. Although variation in axial spacing of impaction disks 29 and baffle plates 31 in the invention results in expected corresponding variation in air flow 35 patterns through housing 23, the axial spacing may be selected within a wide range in the contemplation of the invention and is therefore not limiting thereof, but is an important consideration in constructing a unit with preselected minimum pressure drop across the separator. in selecting the number of allowable stages, and in fitting the unit within imposed space limitations.

Tests were performed on the five-stage demonstration separator 21 at a typical (uniform) ECS system 18 flow rate of 25 lb/min. Results showed that greatest accumulation of snow existed on the second stage disk 29 because flow swirl in the first stage tended to drive snow particles radially outwardly. Successive stages collected progressively lesser amounts of snow. No significant amount of snow was detected at outlet 27 which indicated a high collection efficiency.

The moisture content upstream, downstream and within the demonstration unit were used to calculate the efficiency n of the unit and of each stage thereof as follows:

$$n=(W_u-W_d)/(W_u-W_s)$$

where $W_u$ and $W_d$ is the measured moisture content respectively upstream and downstream of the unit or a stage thereof and $W_s$ is the moisture content in the vapor phase. Observed efficiencies of about 90% for the five-stage unit were consistent with the absence of significant amounts of snow at outlet 27, although high uncertainties in observed efficiencies exist because of an unavoidable uncertainty of about $\pm 1°$ F. in observed temperatures upstream and downstream of the demonstration unit.

The demonstration tests further showed that the precipitation at turbine 19 outlet at temperatures below freezing has characteristics of finely constituted powdery snow rather than subcooled water droplets or granular ice particles, independent of turbine outlet temperature below freezing.

The observed collection efficiency of about 90% implies an average efficiency of about 37% per stage which is close to a value of 40% expected theoretically. An acceptable pressure drop of about 4 psi across the five-stage demonstration unit was somewhat higher than expected for the typical air flow conditions used in the demonstration tests.

The invention therefore provides a low temperature, low pressure separator for removing water, snow or ice from the air supply for the ECS of an aircraft. It is understood that certain modifications to the invention as described may be made, as might occur to one with skill in the field of this invention, within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A device for removing moisture from an air stream comprising:

(a) a generally tubular housing having an inlet and outlet for flow therethrough of an air stream;

(b) a flexible disk disposed centrally of said housing, said disk sized to define with the inner surface of said housing an annular space of preselected size;

(c) a baffle plate disposed between said disk and said outlet and spaced a preselected distance from said disk, said baffle plate defining a central hole therethrough of preselected size;

(d) motor means operatively connected to said disk for controllably flexing said disk whereby moisture deposited on said disk is removed from said disk; and (e) conduit means operatively connected to said housing for draining moisture therefrom.

2. The device of claim 1 wherein said motor means includes a magnetic pulse solenoid.

3. In an environmental control system of an aircraft for conditioning air under pressure for use within said aircraft, said environmental control system including expansion means for diffusing and cooling said air, an improvement comprising a moisture separator operatively connected to the outlet of said expansion means and including:

(a) a generally tubular housing having an inlet operatively connected to said outlet of said expansion means and an outlet for flow therethrough of said air;

(b) a flexible disk disposed centrally of said housing, said disk sized to define with the inner surface of said housing an annular space of preselected size;

(c) a baffle plate disposed between said disk and said outlet and spaced a preselected distance from said disk, said baffle plate defining a central hole therethrough of preselected size;

(d) motor means operatively connected to said disk for controllably flexing said disk whereby moisture deposited on said disk is removed from said disk; and (e) conduit means operatively connected to said housing for draining moisture therefrom.

4. The device of claim 3 wherein said motor means includes a magnetic pulse solenoid.

* * * * *